United States Patent
Lindholm et al.

(10) Patent No.: US 9,706,446 B2
(45) Date of Patent: Jul. 11, 2017

(54) HANDOVER OF EMERGENCY CALL ANCHORED IN IMS TO A CIRCUIT SWITCHED ACCESS NETWORK

(75) Inventors: Fredrik Lindholm, Stockholm (SE); Afshin Abtin, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 192 days.

(21) Appl. No.: 14/373,294

(22) PCT Filed: Mar. 14, 2012

(86) PCT No.: PCT/EP2012/054450
§ 371 (c)(1),
(2), (4) Date: Jul. 18, 2014

(87) PCT Pub. No.: WO2013/135282
PCT Pub. Date: Sep. 19, 2013

(65) Prior Publication Data
US 2015/0024703 A1    Jan. 22, 2015

(51) Int. Cl.
H04M 11/04 (2006.01)
H04W 36/00 (2009.01)
H04W 4/22 (2009.01)

(52) U.S. Cl.
CPC ......... H04W 36/0022 (2013.01); H04W 4/22 (2013.01)

(58) Field of Classification Search
CPC ..... H04W 76/007; H04W 4/22; H04M 11/04; H04M 2242/04; G08B 25/016
See application file for complete search history.

(56) References Cited

U.S. PATENT DOCUMENTS

| 8,249,019 B2* | 8/2012 | Mahdi | H04W 36/0022 370/331 |
| 2011/0230193 A1* | 9/2011 | Vikberg | H04W 36/0022 455/436 |
| 2013/0029629 A1* | 1/2013 | Lindholm | H04W 36/0022 455/404.1 |

FOREIGN PATENT DOCUMENTS

| FI | WO 2010055410 A1 * | 5/2010 | ............. H04W 8/04 |
| WO | WO 2010005410 A1 * | 1/2010 | ......... F16H 61/0009 |

(Continued)

OTHER PUBLICATIONS

International Preliminary Report on Patentability, Application No. PCT/EP2012/054450, dated Sep. 25, 2014, 13 pages.

(Continued)

*Primary Examiner* — Fred Casca
*Assistant Examiner* — Said Elnoubi
(74) *Attorney, Agent, or Firm* — Nicholson De Vos Webster & Elliott, LLP

(57) ABSTRACT

A method performs a Single Radio Voice Call Continuity (SRVCC) Packet Switched (PS) to Circuit Switched (CS) handover of an emergency call that is routed over an IP Multimedia Subsystem (IMS) network. The call is transferred from a first region served by a first Mobility Management Entity (MME) to a second region served by a second MME. The method includes sending a first handover request from the first MME to the second MME to transfer the call. The first handover request includes an Emergency Session Transfer Number for SRVCC (E-STN-SR) identifying an Emergency Access Transfer Function (EATF) in the first region. A second handover request for handover to a CS access is sent to a target Mobile Switching Centre, MSC, and includes the E-STN-SR. The call is handed over to the CS access using the E-STN-SR to route the call via the EATF in the first region.

4 Claims, 7 Drawing Sheets

(56) References Cited

FOREIGN PATENT DOCUMENTS

| WO | WO-2010055410 | 5/2010 |
|---|---|---|
| WO | WO-2010141882 | 12/2010 |

OTHER PUBLICATIONS

International Search Report and Written Opinion of the International Searching Authority, Application No. PCT/EP2012/054450, Nov. 26, 2012, 18 pages.

"3rd Generation Partnership Project; Technical Specification Group Core Network and Terminals; IP multimedia call control protocol based on Session Initiation Protocol (SIP) and Session Description Protocol (SDP); Stage 3 (Release 11)", 3GPP TS 24.229 V11.1.0 (Sep. 2011), 704 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.5.0 (Sep. 2011), 282 pages.

"3rd Generation Partnership Project; Technical Specification Group Services and System Aspects; IP Multimedia Subsystem (IMS) emergency sessions (Release 11)", 3GPP TS 23.167 V11.2.0 (Sep. 2011), 41 pages.

"3rd Generation Partnership Project; Technical Specification Group Services and System Aspects; IP Multimedia Subsystem (IMS) Service Continuity; Stage 2 (Release 11)", 3GPP TS 23.237 V11.2.0 (Sep. 2011), 154 pages.

"3rd Generation Partnership Project; Technical Specification Group Services and System Aspects; IP Multimedia Subsystem (IMS) Service Continuity; Stage 2 (Release 11)", 3GPP TS 23.237 V11.4.0 (Mar. 2012), 169 pages.

"3rd Generation Partnership Project; Technical Specification Group Services and System Aspects; IP Multimedia Subsystem (IMS); Stage 2 (Release 11)", 3GPP TS 23.228 V11.2.0 (Sep. 2011), 274 pages.

"3rd Generation Partnership Project; Technical Specification Group Services and System Aspects; Single Radio Voice Call Continuity (SRVCC); Stage 2 (Release 11)", 3GPP TS 23.216 V11.2.0 (Sep. 2011), 53 pages.

"3rd Generation Partnership Project; Technical Specification Group Services and System Aspects; Single Radio Voice Call Continuity (SRVCC); Stage 2 (Release 11)", 3GPP TS 23.216 V11.4.0 (Mar. 2012), 64 pages.

Tallinn, Estonia , "E-STN-SR configuration", 3GPP T5G 5A WG2 Meeting #73, Nokia Siemens Networks, May 2009, 22 pages.

\* cited by examiner

HANDOVER OF EMERGENCY CALL ANCHORED IN IMS TO A CIRCUIT SWITCHED ACCESS NETWORK

CROSS-REFERENCE TO RELATED APPLICATIONS

This application is a National stage of International Application No. PCT/EP2012/054450, filed Mar. 14, 2012, which are hereby incorporated by reference.

TECHNICAL FIELD

The present invention relates to methods and apparatus in a telecommunications network for enabling handover of an emergency call from a Packet Switched (PS) access network to a Circuit Switched (CS) access network when the call has been established over an IP Multimedia Subsystem (IMS) network. More particularly, the invention relates to handover of an emergency call with Single Radio Voice Call Continuity (SRVCC).

BACKGROUND

IP Multimedia services provide a dynamic combination of voice, video, messaging, data, etc, within the same session. This has lead to a growth in the numbers of basic applications and the media which it is possible to combine, leading to a growth in the number and variety of services offered to the end users—so-called "combinational IP Multimedia" services.

BACKGROUND

IP Multimedia Subsystem (IMS) is the technology defined by the Third Generation Partnership Project (3GPP) to provide Internet Protocol (IP) Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a General Packet Radio Service (GPRS) access network. Although numerous network entities, or nodes are depicted, only those relevant to the present discussion have been assigned reference numerals. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity Layer 1 that connect an IMS subscriber to IMS services form a network that is referred to as the IP-Connectivity Access Network (IP-CAN). The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2 at the Connectivity Layer 1 and network nodes that include Call/Session Control Functions (CSCFs) 5. The CSCFs 5 operate as SIP proxies within the IMS in the middle, Control Layer 4 and include Serving CSCFs (S-CSCFs), Interrogating CSCFs (I-CSCFs) and Proxy CSCFs (P-CSCFs). Other IMS core network entities shown include a Media Resource Function Controller (MRFC), a Border Gateway Control Function BGCF and a Media Gateway Control Function, (MGCF). The IMS also includes a Home Subscriber Server (HSS) 5a, which supports the IMS nodes that handle calls and performs authentication and authorization of the user. The HSS 5a may include or share access of data from a Home Location Register (HLR—not shown), which is a master user database that contains subscription-related information. The top, Application Layer 6 includes the IMS service network 3b. Application Servers (ASs) 7 are provided for implementing IMS service functionality.

As shown in FIG. 1, User Equipment (UE) can access the IMS by attaching to an access network and then over the Connectivity Layer 1, which is part of a PS domain. In that case an IMS session can be set up by the UE using SIP signalling. However, many existing access networks operate only using CS technology, and a UE may also access IMS services via a CS domain 8. Although the CS domain 8 will not handle SIP, procedures are well established for dealing with the provision of media and services between the IMS and a UE using a CS access. In a CS access, A UE attaches via a Radio Access Network (RAN—such as a GSM Edge RAN, GERAN), which is communicatively coupled to a Mobile Switching Centre (MSC) 9.

There are many occasions when during a call/session it is required to transfer or hand over the call/session from one access network to another. There are a variety of factors that are used to determine when a call needs to be handed over to another access network, but these are not particularly relevant to the present discussion. Generally, the access network determines, based on the cells for which the UE reports measurements, when the conditions arise that require a request to be made to the core network for the call to be handed over. One situation that involves a handover of a call is when the UE is a mobile terminal that moves from an area covered by one access network to an area covered by another, neighbouring access network. This is illustrated schematically in FIG. 2. Initially UE 20 accesses an IMS network via a PS access network referred to here as the source network, which in this example is a 3GPP Long Term Evolution (LTE) access network. The UE wirelessly attaches via an eNodeB 21a, which communicates over a S1-U interface with a Serving Gateway (S-GW) 22a and via a S1-MME interface with a Mobile Management Entity (MME) 23a. Communications to/from the IMS pass via the S-GW 22a and a Packet Data Network (PDN) gateway, PDN-GW 24. Normal mobility management is provided by the MME 23a. Handovers between eNodeBs that are managed by the same MME are internal to same MME (and for the purposes of this discussion may be considered as part of the same access network). When the UE 20 moves into an area covered by a neighbouring, target access network (which in this example is also a LTE network) where eNodeB 21*b* is managed by a different MME 23*b* an MME to MME handover is initiated by a Handover Required Command sent from eNodeB 21*a* to the source MME 23*a*, and a Forward Relocation Request from source MME 23*a* to target MME 2*b*. The transfer is controlled by the MMEs 23*a*, 23*b* such that the call from the UE can continue via eNodeB 21*b*, and S-GW 22*b* in the target network. Note that the target S-GW 22*b* communicates with the IMS via the same PDN-GW 24 as before the handover.

Single Radio Voice Call Continuity (SRVCC) is described in 3GPP TS 23.237 and 3GPP TS 23.216, which specify procedures for handover of a voice call from a PS access to a CS access (e.g. transfer of a Voice-over-IP, VoIP, IMS session from an evolved UMTS Terrestrial RAN, E-UTRAN, to a UTRAN/GERAN). This includes procedures relating to emergency calls. When setting up an emergency call, the MME selects a S-GW or PDN-GW (referred to hereafter as S/P-GW) for emergency calls based on an Emergency Access Point Name (APN). An Emergency call Access Transfer Function, EATF, is used as an anchoring node for Emergency call signalling in Voice over LTE (VoLTE) deployments. This enables a SRVCC handover from a PS, (e.g. LTE) access network to a CS (e.g. GSM/Wideband Code Division Multiple Access, WCDMA) access network. The architecture is shown schematically in FIG. 3. The CS access (as shown this is after the handover) from UE 30*a* is via a Base Transceiver Station, BTS/nodeB 31 in the GSM/WCDMA access network, which communicates via a Base Station Controller/Radio Network Controller, BSC/RNC, 32 with a Mobile Switching Centre, MSC 33. In general there may be multiple MSCs in an access network, and mobility management for these may be controlled by an MSC server. For simplicity in FIG. 3 (and in FIGS. 4 and 5 described below) the MSC(s) and MSC server are not shown separately, and in practice these may actually be co-located. The LTE access from UE 30*b* (prior to handover) is via eNodeB 36 and the S/P-GW 37 that was selected by the MME 35.

Also shown in FIG. 3 are a Media Gateway Control Function, MGCF, 34, between the MSC server 33 and the IMS, and an Access Gateway, AGW, 39, which also acts as an Access Transfer Gateway, ATGW, between the S/P-GW 37 and the IMS. The IMS entities shown include a P-CSCF 38, an I-CSCF or S-CSCF 40, EATF 41 and Emergency CSCF, E-CSCF, 42. E-CSCF 42 communicates with a Public Safety Access Point (PSAP) 44 to which the emergency call is routed.

FIG. 4 shows the routing of the signalling and voice media for the emergency call before and after a PS to CS handover with SRVCC, as currently specified. The signalling before handover is from the UE 30*b* via eNodeB 36 and S/P-GW 37 to the IMS via P-CSCF 38 and E-CSCF 42. The E-CSCF 42 routes the signalling to the EATF 41, at which the call is anchored, before the signalling is routed back to the E-CSCF 42 and on to the PSAP 44. Note that PSAP 44 will be connected via another access network at the terminating side, but which is not shown for clarity. The path for the voice media of the emergency call before handover is from UE 30*b* via eNodeB 36, S/P-GW 37, and AGW 39, which communicates directly with the PSAP 44 (i.e. not via the other IMS entities shown).

After handover the signalling from the UE 30*a* is via NodeB 31, BSC/RNC 32, MSC server 33, and I/S-CSCF 40 to the EATF 41. The signalling is then routed via the E-CSCF 42 and on to the PSAP 44 as before. The media path is from the UE 30*a* via NodeB 31, BSC/RNC 32 and MSC server 33, to PSAP 44.

Handover of the Emergency call is initiated in the eNodeB 36, whereupon the MME 35 triggers the handover to the MSC server 33. The MSC server 33 is pre-configured with a specific Emergency Session Transfer Number for SRVCC (E-STN-SR), which it uses for routing of the handover initiation signalling toward the IMS (via I-CSCF 40 and on to EATF 41). The E-STN-SR in IMS is a Public Service Identity, which is stored in the Home Subscriber Server HSS (not shown). The EATF 41 will perform a SDP re-negotiation towards the PSAP 44 to change from the SDP of UE 30*a* to the SDP received from the MSC server 33. The UE 30*a* cannot use SIP/SDP as it is now using a CS access.

Network operators normally segment the network to multiple regions. This helps to provide redundancy in case of a fault in a network system component, enables a scaling model to be used for large countries and allows the dedicated network functionality (e.g. the PSAP) to be located closer to local resources. The network nodes normally interwork within their Region. For example, the EPC, MSC and IMS core nodes in a region are supporting the mobile subscribers in the current region. However, according to the standards, only one logical EATF is defined per network. The EATF address, the E-STN-SR, is, according to 3GPP TS 23.237, an E.164 number, which is configured as a single address for each MSC server. Thus, an MSC server in one region (Region 1) is pre-configured with an E-STN-SR identifying the EATF in Region 1, while an MSC server in another Region (Region 2) is pre-configured with another E-STN-SR identifying the EATF in Region 2.

When a UE that is using a PS (e.g. LTE) access network in one region moves out of the coverage of that LTE network an SRVCC handover is triggered, which may be a PS to CS handover as described above with reference to FIGS. 3 and 4. Provided the UE remains in the same region (Region 1), the MSC server in region 1 will be preconfigured with E-STN-SR of the EATF in Region 1, and so there is no problem in handing over the emergency call as this will continue to be anchored at and routed via the EATF.

However, when a UE that is using a PS (e.g. LTE) access moves from Region 1 to Region 2, there will be a PS to PS handover, as described above with reference to FIG. 2. The serving MME will therefore change from the MME in Region 1 to the MME in Region 2. Also, the MSC servers in Region 2 will be pre-configured with a different E-STN-SR identifying an EATF in Region 2. Consequently, if there is then a PS to CS handover required in Region 2, according to the currently specified procedures, the MSC server in Region 2 will try to route the emergency call through the EATF in Region 2 rather than that in Region 1 where the call was originated and is anchored. As such the PS to CS handover of the emergency call in Region 2 will fail.

The problem is illustrated schematically with reference to FIG. 5, where the network entities shown in each of two regions, Region 1 and Region 2, carry the same reference numerals as used in FIG. 4 and described above.

While in Region 1 a UE 30*a* attaches to the LTE access (eNodeB 36*a*) with an Emergency Attach indication. The MME 35*a* assigns an emergency PDN and returns to the UE 30*a* the address of a P-CSCF 38*a* in Region 1 as part of the bearer activation procedure (as specified in 3GPP TS 23.401 and TS 24.229). The UE 30*a* performs IMS Emergency Registration and sets up an Emergency call, which will be served by the MME 35*a*, S/P-GW 37*a* and IMS in Region 1. The Emergency Call is anchored at the EATF 51*a* in region 1 for a possible Emergency SRVCC handover from LTE to CS later. This EATF 51*a* has the address E-STN-SR-1, which is pre-configured in the MSC servers 33*a* in Region 1.

Assuming that the UE 30*a* is near the edge of coverage of the MME 35 in Region 1 and is close to the coverage of Region 2, then if the UE 30*a* moves such that an MME handover takes place (as in FIG. 2), to become UE 30*b* in Region 2, the serving MME will be changed to MME 35*b* in Region 2, while the emergency call continues to be routed via PDN GW 37*a* in Region 1, and IMS in region 1 will continue to serve the user, with the call being anchored at the EATF 51*a* in Region 1.

Now assuming that in Region 2 the UE 30*b* moves out of LTE coverage such that a PS to CS SRVCC handover procedure is initiated, then the MME 35*b* in Region 2 will send a handover request to an MSC 33*b* in the same region (Region 2). However, the MSC 33*b* in Region 2 has its own pre-configured E-STN-SR (E-STN-SR-2), and so will initiate the handover towards the IMS in Region 2, with E-STN-SR-2 identifying the EATF 51*b* in Region 2. However, the SRVCC handover will fail as the call is anchored at the EATF 51*a* in Region 1.

SUMMARY

According to a first aspect there is provided a method of performing a Single Radio Voice Call Continuity, SRVCC, Packet Switched, PS, to Circuit Switched, CS, handover of an emergency call that is routed over an IP Multimedia Subsystem, IMS, network. The emergency call is first transferred from an access in a first region served by a first Mobility Management Entity, MME, to a second region served by a second MME. The method includes sending a first handover request from the first MME to the second MME to transfer the call to the second region. The first handover request includes an Emergency Session Transfer Number for SRVCC, E-STN-SR, identifying an Emergency Access Transfer Function, EATF, in the first region. A second handover request for handover to a CS access is sent to a target Mobile Switching Centre, MSC, and includes the E-STN-SR. The emergency call is handed over to the CS access using the E-STN-SR to route the call via the EATF in the first region.

According to a second aspect there is provided a Mobile Management Entity, MME, serving a region of a mobile telecommunications network and configured to manage a Single Radio Voice Call Continuity, SRVCC, Packet Switched, PS, to Circuit Switched, CS, handover of an emergency call. The emergency call was first established in another region served by another MME. The MME is configured, on receiving a request for a handover of the emergency call to a CS access via a Mobile Switching Centre, MSC, server, to provide the MSC server with an Emergency Session Transfer Number for SRVCC, E-STN-SR, identifying an Emergency Access Transfer Function, EATF, at which the emergency call is anchored in said other region.

According to another aspect, there is provided a Mobile Management Entity, MME, serving a first region of a mobile telecommunications network. The MME is configured to manage a transfer of an emergency call that is routed over an IP Multimedia Subsystem, IMS, network, and is anchored at an Emergency Access Transfer Function, EATF, serving the first region, to a second region served by a second MME. The MME is configured to provide the second MME with an Emergency Session Transfer Number for SRVCC, E-STN-SR, identifying the EATF in the first region at which the emergency call is anchored.

According to still another aspect there is provided a Mobile Switching Centre, MSC, server serving a first region of a mobile telecommunications network configured to action a request for a handover of an emergency call from a Packet Switched, PS, to a Circuit Switched, CS, access with Single Radio Voice Call Continuity, SRVCC. The handover request includes a specified Emergency Session Transfer Number for SRVCC, E-STN-SR. The MSC server uses the E-STN-SR in the handover of the emergency call to route the call via an Emergency Access Transfer Function, EATF, in a second Region identified by the E-STN-SR.

It will be appreciated that the mechanisms described herein may be implemented in software. Accordingly, further aspects include a computer program and a computer program product comprising instructions that cause a computer to implement the mechanisms.

It is an advantage that the method and configuration of the network entities ensure that, even in cases of an EPC (PS to PS) handover occurring before a SRVCC HO (PS to CS), the emergency call will not be dropped and the handover is performed in a correct and quick way.

Thus, embodiments provide a mechanism to enable a successful SRVCC handover in the situation described above with reference to FIG. 5. The MME 35*b* in Region 2 initiates the PS to CS handover command towards the MSC 33*b* in Region 2 so that it can prepare radio resources in Region 2 (as the UE 30*b* is now in region 2). However, the MSC can now initiate the SRVCC signalling towards the IMS/EATF in Region 1.

The situations described mainly arise on the border between two regions, e.g. on the border between to provinces. However the mechanisms are not limited to such situations.

DETAILED DESCRIPTION

Figure 1:
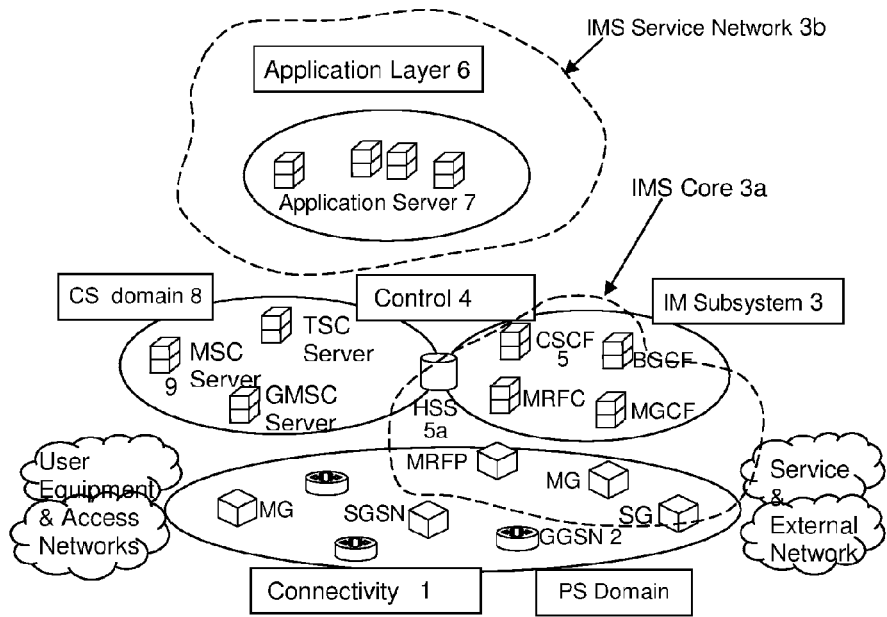
FIG. 1 illustrates schematically an IMS network in association with a mobile network architecture of a General Packet Radio Service (GPRS) access network.
Figure 2:
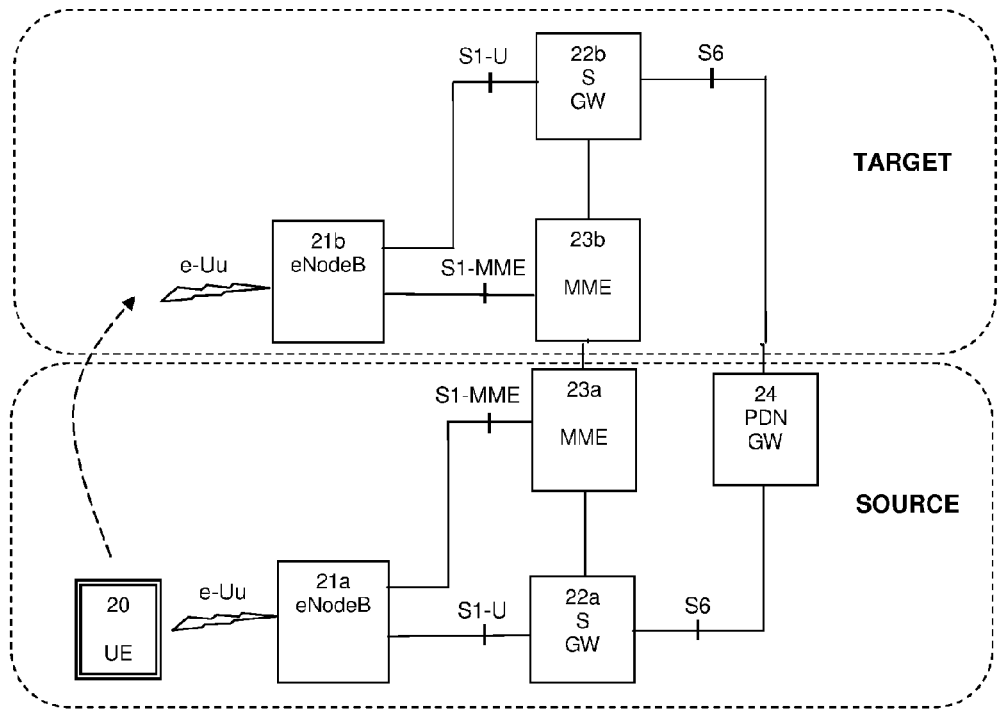
FIG. 2 illustrates schematically a handover of call from a source to a target LTE access network.
Figure 3:
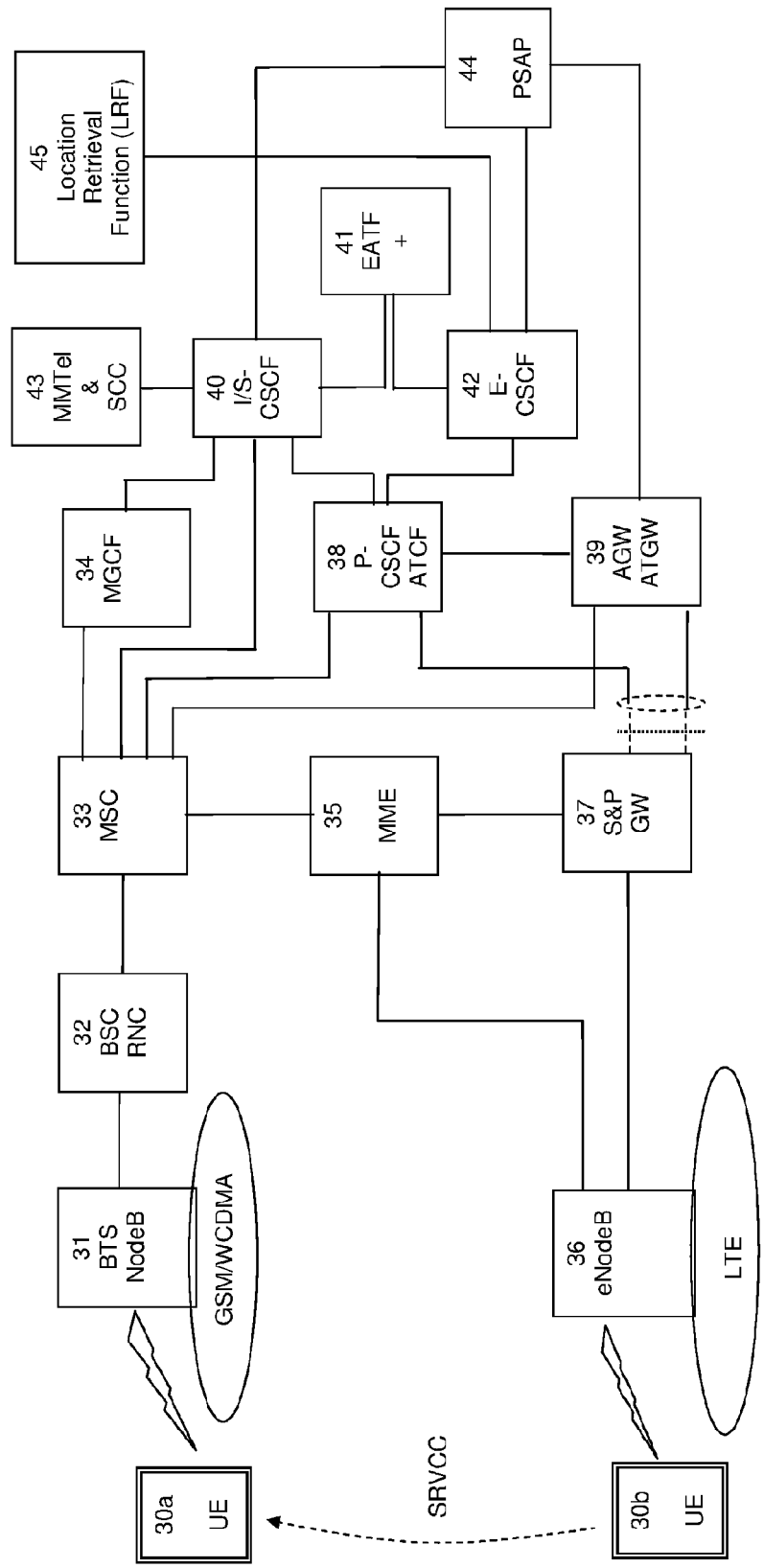
FIG. 3 illustrates schematically a handover of an emergency call from a LTE access network to a CS access network
Figure 4:
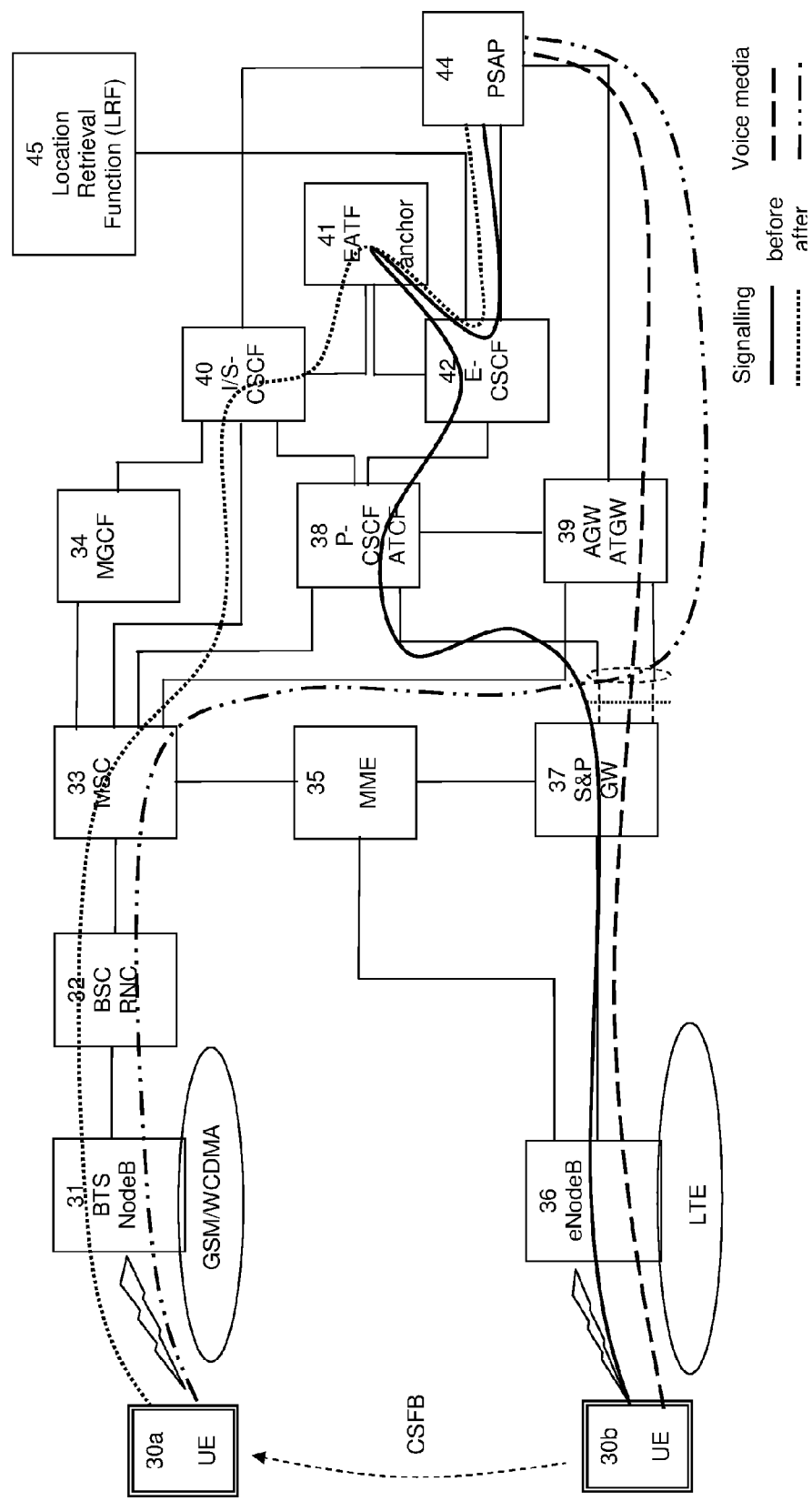
FIG. 4 illustrates the signalling and media paths before and after the handover of FIG. 3.
Figure 5:
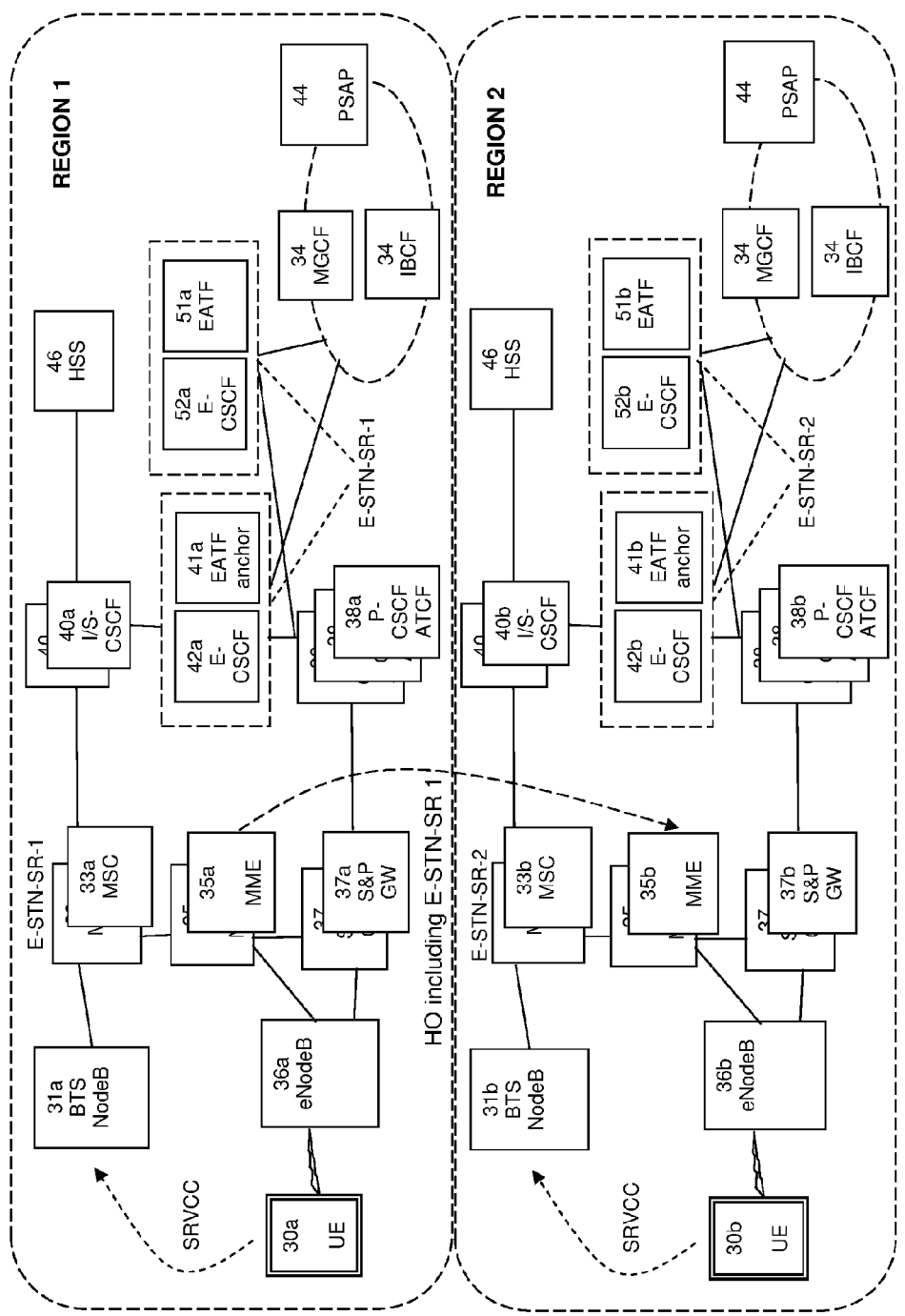
FIG. 5 is a schematic illustration of two regions in a network in which an emergency call is handed over from a PS to a CS access.
Figure 6:
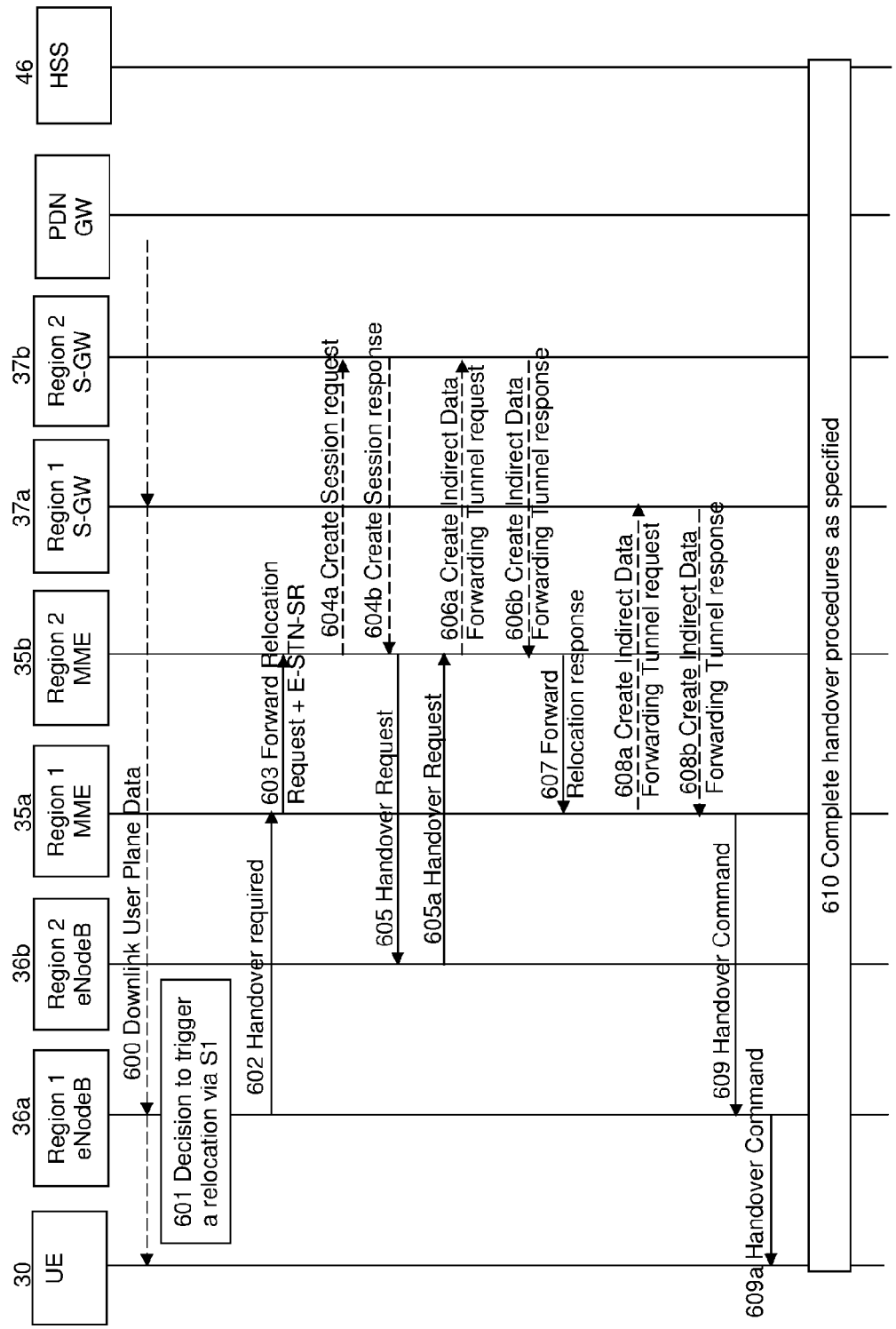
FIG. 6 is a signal chart showing the signalling involved in a handover of an emergency call between two regions of a network.

FIG. 6 illustrates the signalling involved in the procedure for relocation of handing over an emergency call when a UE 30 is moved (relocated) from one Region to another. The network entities have the same reference numerals as used in FIG. 5 above. The procedure essentially follows that specified in 3GPP TS23.401, but with one important difference.

Signal 600 represents the downlink of user plane data to the UE 30 as a result of an emergency call/session establishment. At step 601, the eNodeB 36a in Region 1 initiates a handover that involves a relocation from Region 1 to Region 2. Accordingly, signal 602 is a handover request sent from the eNodeB 36a to the MME 35a in Region 1. Signal 603 is a relocation request sent from the MME 35a in Region 1 to the MME 35b in Region 2. The relocation request 603 also includes the E-STN-SR(1) identifying the EATF in Region 1 where the emergency call is anchored. Note that, as currently configured according to the specifications, the MME 35a is not provided with any E-STN-SR. It is only the MSCs that are provided with the E-STN-SR. Accordingly, to be able to support the new procedures, the MME 35a needs to be configured with the E-STN-SR(1) applicable for its own Region (or by other mean obtain the local E-STN-SR(1)), and the interface for the handover between MMEs (MME to MME S10) needs to be extended with an optional E-STN-SR.

Signals 604a and 604b represent the exchange of signalling for establishing the emergency call session in Region 2. When this has been established there is an exchange of handover request signals 605, 605a with the access network (eNodeB 36b) in Region 2, followed by a request 606a sent to the S-GW 37b in Region 2 to set up an indirect data forwarding tunnel, to which the S-GW 37b responds with signal 606b. The MME 35b in Region 2 then sends a relocation handover response 607 to the MME 35a in Region 1. Because the emergency call is still to be routed via the IMS in Region 1, the MME 35a in Region 1 sends a request 608a to the S-GW 37a in Region 1 to set up an indirect data forwarding tunnel, to which the S-GW 37a responds with signal 608b. The emergency call can now be handed over to the Region 2 access, so the MME 35a in Region 1 sends a handover command 609 to the eNodeB 36a in Region 1, which then forwards a handover command 609a to the UE. The handover can then proceed as specified in the standards (610).

Figure 7:
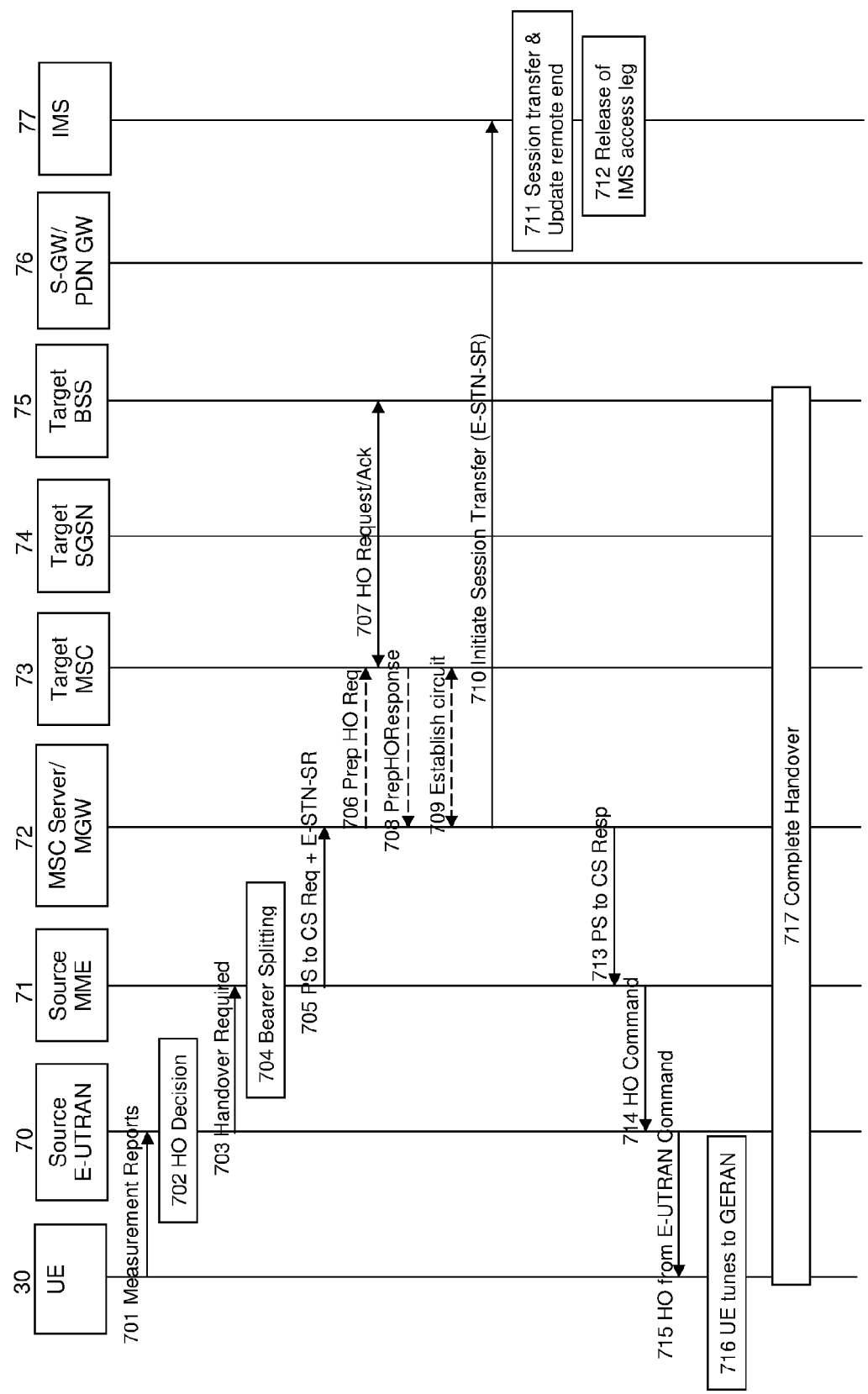
FIG. 7 is a signal chart showing the signalling involved in a PS to CS handover of an emergency call.

FIG. 7 illustrates the procedure when, following the relocation handover described above with reference to FIG. 6, there is a PS to CS handover of the emergency call. As shown, the entities involved are: the UE 30; the source PS access, which in this example is shown as source E-UTRAN 70; the source MME 71; an MSC server/MGW 72; a target MSC 73 (i.e. the MSC that will be handling the call when handed over to the CS access—note that in this case the MSC server 72 is shown as a separate entity, although in practice it could be co-located with the MSC 73); a target SGSN 74 is also shown, as this may be involved during the handover to move any PS bearers; the target CS access network, here represented by target Base Station Server (BSS) 75; the S/P-GW 76, and the IMS 77. Note that the P-GW, which is shown as the integral S/P-GW 76 and the IMS 77 are in the Region where the emergency call is anchored (i.e. Region 1), whereas the other entities are all in Region 2.

Signal 701 represents the measurement reports that are received at the source access network 70, based on which a handover decision 702 is made. Signal 703 is a handover required signal sent to the MME 71. At step 704, the source MME 71 performs a bearer splitting (i.e., separates the emergency voice call that is being moved to the CS access from any other PS bearers that may be required to be moved to the target PS network) and then sends a PS to CS handover request to the MSC server/MGW 72. This request also includes the E-STN-SR(1), which the MME 71 received from the MME in Region 1 when the call was relocated from Region 1 to Region 2 and which identifies the EATF in Region 1 where the emergency call is anchored.

Signal 706 is a request to prepare for handover sent from the MSC server/MGW 72 to the target MSC 73. Signals 707 are an exchange of request and acknowledgement of the handover between the target MSC 73 and target BSS 75. Signal 708 is a response to prepare for handover request sent back to the MSC server/MGW 72 from the target MSC 73. The MSC server/MGW 72 then sends a signal 710 to the IMS 77 to initiate the session transfer. At step 711 the IMS 77 performs the session transfer and updates the remote end (i.e. the PSAP attachment end). At step 712, the IMS releases the previous session between UE and EATF over the PS access.

Signal 713 is a PS to CS handover response sent back from the MSC server/MGW 72 to the source MME 71. The source MME 71 then sends a handover command 714 to the PS access network 70, which then sends a handover command 715 to the UE 30. At step 716, in response to the handover instruction 715, the UE tunes to the GERAN, CS access. At step 717 the handover is completed in accordance with the standard procedure.

As can be seen, when there is a request for a SRVCC PS to CS handover, the MME 71 in Region 2 is now configured to send the PS to CS handover request including the E-STN-SR-1 identifying the EATF in Region 1 at which the emergency call is anchored. The MSC server 72 can then send the SRVCC SIP initiation request (signal 710 in FIG. 7) to the IMS in Region 1. According to the currently specified procedures (3GPP TS 23.216 for the Sv interface) no E-STN-SR is sent at an SRVCC handover. The Sv interface between the MME and MSC is therefore to be extended to include an optional E-STN-SR. When an E-STN-SR is sent from a source MME to a target MME at a relocation handover (FIG. 6), it can then be provided to the MSC as part of the new procedure for a SRVCC handover from PS to CS. Note that if no E-STN-SR is received from the MME in a PS to CS handover request, the MSC will use its own pre-configured E-STN-SR as normal.

Figure 8:
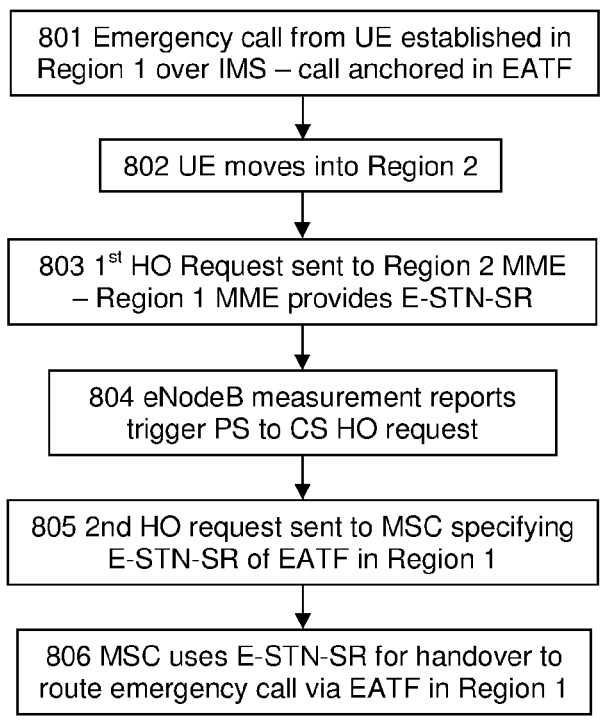
FIG. 8 is a flow chart illustrating the steps in a method of handing over an emergency call.

FIG. 8 illustrates the principal process steps involved in the method of performing a SRVCC PS to CS handover of an emergency call that is routed over an IMS network, and in which the emergency call is first transferred from an access in Region 1, served by a first MME, to an access in Region 2 served by a second MME. As shown, at step 801 an emergency call from a UE is established in Region 1 over the IMS. The emergency call is anchored in an EATF in the IMS in Region 1. At step 802 the UE moves into the coverage of Region 2. At step 803 a first handover request is sent from the first MME (in Region 1) to the second MME (in Region 2) to transfer the call to the Region 2, the first handover request includes an E-STN-SR identifying the EATF in Region 1. At step 804, measurement reports received by the eNodeB in Region 2 trigger a PS to CS handover request. At step 805 a second, PS to CS, handover request is sent to a target MSC and includes the E-STN-SR of the EATF in Region 1. At step 806, MSC uses the E-STN-SR for the handover to the CS access so as to route the emergency call via the EATF in Region 1.

The invention claimed is:

1. A method of performing a Single Radio Voice Call Continuity (SRVCC) handover of an emergency call from a Packet Switched (PS) access network to a Circuit Switched (CS) access network and that is routed over an IP Multimedia Subsystem (IMS) network, wherein the emergency call is first transferred from an access network in a first region served by a first Mobility Management Entity (MME) to a second region served by a second MME, the method comprising:

sending a first handover request from the first MME to the second MME to transfer the emergency call to the second region, the first handover request including an Emergency Session Transfer Number for the SRVCC (E-STN-SR) identifying an Emergency Access Transfer Function (EATF) in the first region;

sending a second handover request for handover to a CS access network, the second handover request being sent from the second MME to a target Mobile Switching Centre (MSC) and including the E-STN-SR identifying the EATF in the first region, wherein the second handover request is sent over an Sv interface between the second MME and the target MSC, wherein the Sv interface has been extended to include an optional E-STN-SR; and handing over the emergency call to the CS access network using the E-STN-SR to route the emergency call via the EATF in the first region, wherein prior to handing over the emergency call to the CS access network, the target MSC initiates a session transfer by sending a message to the IMS network using the E-STN-SR, and wherein the target MSC is preconfigured with an E-STN-SR that identifies an EATF in the second region to which emergency calls that are handed over to the CS access network are routed when the handover request does not include an E-STN-SR of an EATF in another region.

2. A first Mobile Management Entity (MME) that serves a first region of a mobile telecommunications network and operative to manage a Single Radio Voice Call Continuity (SRVCC) handover of an emergency call from a Packet Switched (PS) access network to a Circuit Switched (CS) access network, wherein the emergency call was first established in a second region served by a second MME and was handed over to the first MME together with an Emergency Session Transfer Number for SRVCC (E-STN-SR) identifying an Emergency Access Transfer Function (EATF) at which the emergency call is anchored in the second region, and wherein the first MME is further operative, when a request is received for a handover of the emergency call from the PS access network to the CS access network via a Mobile Switching Centre (MSC) server, to provide the MSC server with the E-STN-SR, wherein the handover request is sent over an Sv interface between the first MME and the MSC server, wherein the Sv interface has been extended to include an optional E-STN-SR, and wherein prior to handing over the emergency call to the CS access network, the MSC initiates a session transfer by sending a message to an IP Multimedia Subsystem (IMS) network using the E-STN-SR, and wherein the MSC is preconfigured with an E-STN-SR that identifies an EATF in the second region to which emergency calls that are handed over to the CS access network are routed when the handover request does not include an E-STN-SR of an EATF in another region.

3. A first Mobile Management Entity (MME) that serves a first region of a mobile telecommunications network and operative to manage a transfer of an emergency call that is routed over an IP Multimedia Subsystem (IMS) network, and is anchored at an Emergency Access Transfer Function (EATF) serving the first region, to a second region served by a second MME and to provide the second MME with an Emergency Session Transfer Number for SRVCC (E-STN-SR) that identifies the EATF in the first region at which the emergency call is anchored, so that if the second MME subsequently initiates an SRVCC handover of the emergency call to a Circuit Switched (CS) access network via a Mobile Switching Centre (MSC) server it can provide the E-STN-SR to the MSC server to route the emergency call via the EATF serving the first region, wherein a request for the SRVCC handover of the emergency call to the CS access network is sent over an Sv interface between the second MME and the MSC server, wherein the Sv interface has been extended to include an optional E-STN-SR, wherein prior to handing over the emergency call to the CS access network, the MSC server initiates a session transfer by sending a message to the IMS network using the E-STN-SR, and wherein the MSC server is preconfigured with an E-STN-SR that identifies an EATF in the second region to which emergency calls that are handed over to the CS access network are routed when the handover request does not include an E-STN-SR of an EATF in another region.

4. A Mobile Switching Centre (MSC) server of a mobile telecommunications network operative to receive, from a Mobile Management Entity (MME) that serves a first region, a request for a handover of an emergency call from a Packet Switched (PS) access network to a Circuit Switched (CS) access network with Single Radio Voice Call Continuity (SRVCC), wherein the handover request includes a specified Emergency Session Transfer Number for SRVCC (E-STN-SR), the MSC server further operative to use the E-STN-SR in the handover of the emergency call to route the emergency call via an Emergency Access Transfer Function (EATF) at which the emergency call is anchored, wherein the EATF is in a second region that is different from the first region, wherein a request for the SRVCC handover of the emergency call to the CS access network is sent over an Sv interface between the MME and the MSC, wherein the Sv interface has been extended to include an optional E-STN-SR, wherein prior to handing over the emergency call to the CS access network, the MSC server is operative to initiate a session transfer by sending a message to an IMS network using the E-STN-SR, and wherein the MSC server is preconfigured with an E-STN-SR that identifies an EATF in the second region to which emergency calls that are handed over to the CS access network are routed when the handover request does not include an E-STN-SR of an EATF in another region.

* * * * *